Dec. 26, 1922.  1,440,188

H. K. THOMAS.
SPRING SUSPENSION MEANS FOR VEHICLES.
FILED JAN. 25, 1922.

Inventor
Hugh Kerr Thomas
by Byrnes Stebbins Burgess & Namaka
his Attorneys

Dec. 26, 1922.
H. K. THOMAS.
SPRING SUSPENSION MEANS FOR VEHICLES.
FILED JAN. 25, 1922.
1,440,188
2 SHEETS-SHEET 2
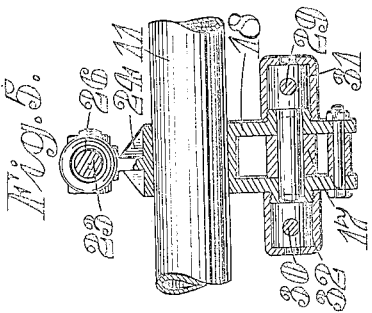
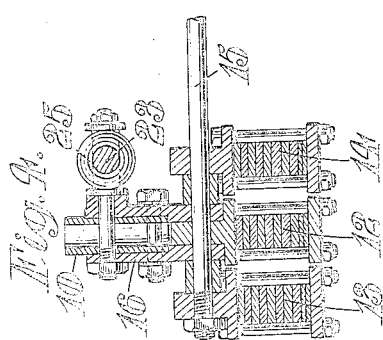
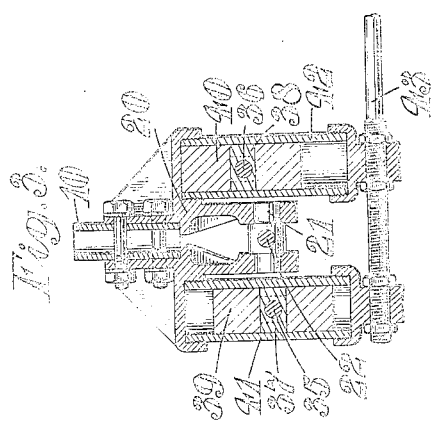
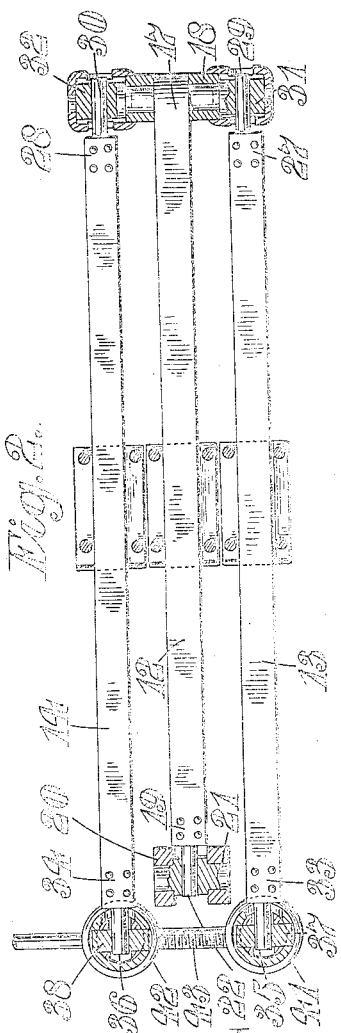
Inventor
Hugh Kerr Thomas
by Cyrus Kehoe, Burgess Kimmel
his Attorneys Patented Dec. 26, 1922.

1,440,188

UNITED STATES PATENT OFFICE.

HUGH KERR THOMAS, OF WALTHAMSTOW, LONDON, ENGLAND, ASSIGNOR TO THE ASSOCIATED EQUIPMENT COMPANY LIMITED, OF WESTMINSTER, LONDON, ENGLAND, A BRITISH COMPANY.

SPRING SUSPENSION MEANS FOR VEHICLES.

Application filed January 25, 1922. Serial No. 531,568.

*To all whom it may concern:*

Be it known that I, HUGH KERR THOMAS, a subject of the King of England, residing at Walthamstow, London, England, have invented certain new and useful Improvements in Spring Suspension Means for Vehicles, of which the following is a specification.

This invention is for improvements in or relating to spring suspension means for vehicles and has for one of its objects to provide a construction in which the vehicle will be adequately sprung at various different loads. The difficulty of arranging springing to suit different loads which may have to be carried in the same vehicle is well known and there is provided according to the present invention an improved construction which effectively deals with this problem.

It has already been proposed in spring suspension means for vehicles to employ at a single point of suspension two or more separate springs whereof one is so coupled at both ends to the two parts of the vehicle which are to be sprung the one from the other as always to be in operation, and the other or others are each connected to a vehicle part through a lost motion connection so as only to be brought into operation as the load on the vehicle is increased. The construction according to the present invention follows these lines, and its characteristic feature is that the said lost motion connection or connections includes a dash-pot device for each such connection. Smooth running is thereby facilitated.

The term "a single point of suspension" is intended to describe one unit of the spring suspension means such as exists for example at one end of a road wheel axle.

The invention is particularly applicable to passenger vehicles in which the load is constantly varying, but is, of course, not limited to this particular use.

According to another feature of the invention there are provided in combination, and at a single point of suspension, two or more cantilever springs arranged side by side and each connected towards one end to one vehicle part, and pivotally mounted on the other vehicle part, towards the middle of their length, and one being directly connected at its other end to the last named vehicle part and the other spring or springs being connected at their other ends to such vehicle part through dash-pot connections.

For a more complete understanding of the invention there will now be described, by way of example only and with reference to the accompanying drawings, one constructional form of spring suspension means for vehicles according to the invention. It is to be understood, however, that the invention is not limited to the precise constructional details set forth.

In these drawings:—

Figure 2 is a sectional plan view on the line 2—2 of Figure 1;

Figure 3 is a cross-section on the line 3—3 of Figure 1;

Figure 4 is a cross-section on the line 4—4 of Figure 1, and

Figure 5 is a cross-section on the line 5—5 of Figure 1;

Like reference numerals indicate like parts throughout the drawings.

Figure 1:
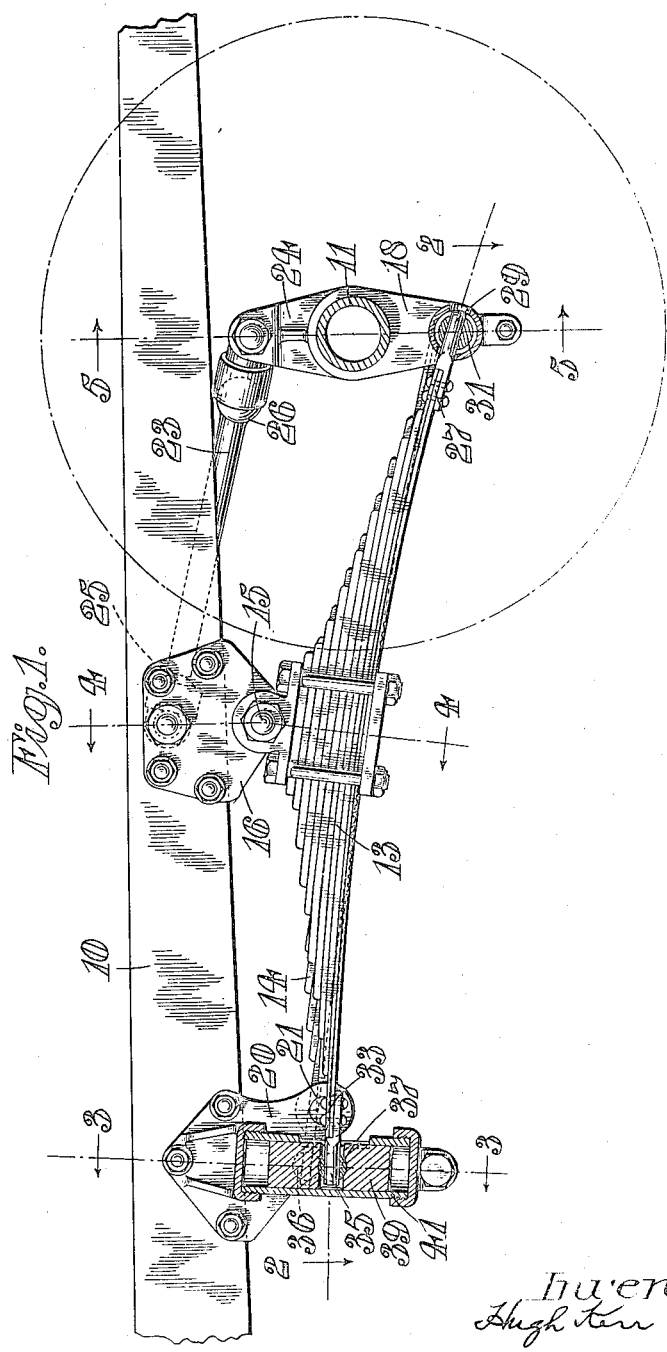
Figure 1 is a side elevation, partly in section, of a unit of a spring suspension means.

In the drawings a portion of a vehicle chassis is indicated at 10 and a road wheel axle at 11. To spring the one from the other there are employed in the constructional form of the invention illustrated, three cantilever springs 12, 13 and 14, but it is to be understood that the invention is not limited to the employment of three such springs as two or any other greater number may be used. The springs are separately pivoted towards the middle of their length upon a bar 15 carried by a bracket 16 secured to the chassis member 10. Conveniently this bar 15 extends across the vehicle to receive at its other end other springs situated at the other side of the vehicle. The spring 12 is alone intended to support the vehicle when empty, and it is so mounted as to be always in operation. One of its ends 17 is secured to an extension 18 from the axle 11 and its other end 19 is supported in a bracket 20 mounted upon the chassis member 10. The connection between the members 12 and 20 at the end 19 of the former includes a member 21 which is pivotally mounted in the bracket 20 and which is perforated to receive an extension 22 from the spring 12. This extension 22 can slide in the member 21 as movement of the spring 12 occurs due to variations in the load. The member 21 can also adjust itself in its bearings to suit any position which the spring 12 may take up relatively to the bracket 20. Thus, when the vehicle is running light the spring 12 operates in the well known manner to support the chassis from the axle. A radius rod 23 is provided which extends between the bracket 16 and an upward extension 24 from the axle, and preferably ball joints 25 and 26 are provided at the ends of this rod.

The springs 13 and 14 are intended to come into operation one after the other as the load on the vehicle increases. For example, in a convenient arrangement the spring 13 might come into operation when the vehicle has received half its load and the spring 14 when the vehicle is fully loaded. To effect this, the ends 33 and 34 of the springs 13 and 14 are situated at different vertical levels relatively to the chassis member 10 so that the spring 13 can come into operation before the spring 14, and a lost motion connection is provided between said chassis member and each of the said spring ends. The other ends 27 and 28 of the springs have extensions 29 and 30 which are mounted to slide in pivoted members 31 and 32 carried by the axle extension 18. The ends 33 and 34 have extensions 35 and 36 which are received to slide in cylindrical members 37 and 38 which are mounted in bearings in pistons 39 and 40. These pistons 39 and 40 reciprocate in cylinders 41 and 42 carried at their upper ends by the bracket 20 and preferably connected at their lower ends by a bar 43 to similar cylinders at the other side of the vehicle. The pistons 39 and 40 and their respective cylinders constitute dash-pot devices which furnish a lost motion connection between the springs 13 and 14 and the chassis member 10. Suitable leak passages, not shown, may be provided to control the rate of movement of the pistons in their cylinders and thus regulate the lost motion of the spring ends 33 and 34.

It will be appreciated that until the lower ends of the pistons 39 and 40 have come into contact with the ends of their respective cylinders, the springs to which they are appropriated will not have any solid bearing at the ends 33 and 34 and consequently will not be fully effective so far as the springing of the vehicle is concerned, although of course there will be a certain amount of cushioning effect as the air is being expelled through the leak passages in the cylinders. But as the load increases first one piston and then the other piston will reach its cylinder bottom and the respective springs come fully into operation. The sliding connection at the ends of the springs operates to obtain smooth running and furthermore the dashpot action of the pistons 39 and 40 in their cylinders will be effective to minimize jolting.

Since the loading and deflection of each spring is different, there will be a plurality of springs with different periods of vibration operating at a single point of suspension and they will co-operate with each other to damp rebounds after shocks or jolts.

From the foregoing it will be appreciated that there is provided according to the present invention a simple construction of spring suspension having but few working parts which will automatically adjust itself to suit the loading of the vehicle so that under all conditions effective springing of the vehicle will be assured. The invention, is, therefore, particularly useful in connection with passenger vehicles.

I claim.

1. In spring suspension means for vehicles and at a single point of suspension, the combination with the two parts of the vehicle which are to be sprung the one from the other, of a plurality of separate springs, means for coupling one of said springs at both ends to the two said vehicle parts so as always to be in operation, means for coupling one end of each remaining spring to one vehicle part, and a dashpot for coupling the other end of each such remaining springs to the other vehicle part.

2. In spring suspension means at one end of a vehicle axle, the combination with the two parts of the vehicle which are to be sprung the one from the other, of three separate springs, means for coupling one of said springs at both ends to the two said vehicle parts so as always to be in operation, means for coupling one end of each of the other two springs to one vehicle part, and lost motion connections, including a dashpot, for coupling the other end of each such two springs to the other vehicle part.

3. In spring suspension means for vehicles, and at a single point of suspension, the combination with the two parts of the vehicle which are to be sprung the one from the other, of a plurality of separate cantilever springs arranged side by side, means for connecting each such spring towards one end to one vehicle part, means for pivotally mounting the springs towards the middle of their length on the other vehicle part, means for directly connecting one spring at its other end to the last named vehicle part, and dashpot connections for coupling the remaining springs at their other ends to such vehicle part.

4. In spring suspension means at one end of the vehicle axle, the combination with the two parts of the vehicle which are to be sprung the one from the other, of a plurality of separate leaf springs, sliding connections for coupling one of said springs at both ends to the two said vehicle parts so as always to be in operation, sliding connections for coupling one end of each of the remaining springs to one vehicle part, and dashpot connections for coupling the other end of each such remaining springs to the other vehicle part.

5. In spring suspension means for vehicles, and at a single point of suspension, the combination with the vehicle chassis and an axle which are to be sprung the one from the other, of a plurality of separate cantilever leaf springs arranged side by side, sliding connections for coupling each such spring toward one end to the axle, means for pivotally mounting the springs towards the middle of their length on the vehicle chassis, a sliding connection for directly coupling one spring at its other end to the vehicle chassis, and dashpot connections for coupling the remaining springs at their other ends to the vehicle chassis.

6. In spring suspension means for vehicles, and at a single point of suspension, the combination with the vehicle chassis and an axle which are to be sprung the one from the other, of a plurality of separate cantilever leaf springs arranged side by side, sliding connections for coupling each such spring towards one end to the axle, means for pivotally mounting the springs towards the middle of their length on the vehicle chassis, a sliding connection for directly coupling one spring at its other end to the vehicle chassis, dashpot cylinders, one for each of the remaining springs, means for mounting said cylinders on the vehicle chassis, pistons in said cylinders, and sliding connections for coupling each remaining spring at its other end to one of said pistons.

In testimony whereof I have signed my name to this specification in presence of two subscribing witnesses.

HUGH KERR THOMAS.

Witnesses:
J. S. V. LINDSAY,
LEONARD TOWERS.